(12) United States Patent
Chandwani et al.

(10) Patent No.: US 9,838,191 B2
(45) Date of Patent: Dec. 5, 2017

(54) LTE-U AND LTE CARRIER AGGREGATION ACTIVATION, DEACTIVATION, AND ACCOUNTING

(71) Applicant: Verizon Patent and Licensing Inc., Arlington, VA (US)

(72) Inventors: Rakesh Chandwani, Freehold, NJ (US); Jignesh S. Panchal, Somerset, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 14/696,333

(22) Filed: Apr. 24, 2015

(65) Prior Publication Data

US 2016/0315751 A1  Oct. 27, 2016

(51) Int. Cl.
*H04W 4/00* (2009.01)
*H04L 5/00* (2006.01)
*H04W 16/14* (2009.01)
*H04W 72/08* (2009.01)

(52) U.S. Cl.
CPC .......... *H04L 5/0094* (2013.01); *H04W 16/14* (2013.01); *H04W 72/08* (2013.01)

(58) Field of Classification Search
USPC ................... 370/252, 280, 328, 330, 331
See application file for complete search history.

(56) References Cited

U.S. PATENT DOCUMENTS

| | | | |
|---|---|---|---|
| 2015/0133081 A1* | 5/2015 | Griot ................... | H04L 12/1435 455/407 |
| 2016/0183220 A1* | 6/2016 | Rashid ................ | H04W 72/042 370/329 |

* cited by examiner

*Primary Examiner* — Phuongchau Ba Nguyen (57) ABSTRACT

Carrier aggregation may be performed using licensed (e.g., LTE) and unlicensed (e.g., LTE-U) spectrum in which the amount of data associated with users may be separately tracked for the licensed and unlicensed communications. The tracking for the amount of licensed and unlicensed data may be performed at base stations associated with a wireless network. In some implementations, a base station may maintain a number of profiles that each indicate how and/or when carrier aggregation is to be divided or performed.

19 Claims, 8 Drawing Sheets

LTE-U AND LTE CARRIER AGGREGATION ACTIVATION, DEACTIVATION, AND ACCOUNTING

BACKGROUND

Long-Term Evolution (LTE) is a standard for wireless communication of high-speed data for mobile phones and data terminals. The LTE standard is based on the Global System for Mobile Communications (GSM)/Enhanced Data Rates for GSM (EDGE) and Universal Mobile Telecommunications System (UMTS)/High Speed Packet Access (HSPA) network technologies, but increases the capacity and speed using a different radio interface together with core network improvements.

"LTE Advanced in unlicensed spectrum" (LTE-U) refers to a proposal to deliver LTE with small cells using unlicensed (e.g., 5 GHz) spectrum. LTE-U devices may wirelessly transmit and receive data using unlicensed and/or licensed spectrum. By tapping into the spectrum resources of the unlicensed bands, network operators may potentially obtain greater throughput and user satisfaction.

In carrier aggregation, a network operator may cause a mobile device to concurrently use both the LTE and LTE-U spectrums to provide greater throughput, greater reliability, and/or decreased cost relative to using only one of the LTE and LTE-U spectrums at a time. From the perspective of the network operator, the cost (e.g., the cost per unit of data) may be different for communications made using the LTE and LTE-U spectrums. Additionally, the quality and/or reliability of the LTE and LTE-U spectrums may be generally different.

DETAILED DESCRIPTION OF PREFERRED EMBODIMENTS

The following detailed description refers to the accompanying drawings. The same reference numbers in different drawings may identify the same or similar elements.

Techniques described herein may provide for carrier aggregation using licensed (e.g., LTE) and unlicensed (e.g., LTE-U) spectrum in which the amount of data associated with users may be separately tracked for licensed and unlicensed communications. In one implementation, the amount of data tracked for the licensed and unlicensed communications may be tracked on a per-user and/or on a per-Quality of Service (QoS) basis. The tracking for the amount of licensed and unlicensed data may be performed at base stations associated with the wireless network.

In some implementations, a base station may maintain a number of profiles that each indicate how carrier aggregation is to be divided between licensed and unlicensed spectrum. For example, a particular profile, when active, may indicate a target ratio of use for the licensed/unlicensed spectrum. The tracking of the amount of licensed and unlicensed data may be used to implement the profile. Additionally, the tracking of the amount of licensed and unlicensed data may be used as a factor in determining whether to activate a particular profile. Other factors, such as time of day, date, network load, and/or user preferences may also be used as a factor in determining whether to activate a particular profile.

The term "licensed spectrum," as used herein, may refer to the spectrum of radio frequencies that can only be used with a license from a controlling government entity. Licensed radio spectrum is typically used by network operators to provider geographically comprehensive cellular wireless networks, which may be referred to as "Wireless Wide Area Networks" (WWANs). Base stations in wireless networks implemented with licensed spectrum may be composed of relatively large "cells" that each provide coverage to a particular area. Because network providers may have exclusive control over the use of a particular licensed frequency band, communications conducted over licensed spectrum may generally be more reliable and predictable than communications conducted over unlicensed spectrum.

The term "unlicensed spectrum," as used herein, may refer to the spectrum of radio frequencies that can used without a license from a controlling government entity. Wireless Local Area Networks (WLANs) are typically implemented using unlicensed radio spectrum. Examples of radio technologies that can be used to implement a WLAN, using unlicensed spectrum, are the WiFi (i.e., using Institute of Electrical and Electronics Engineers (IEEE) 802.11-based standards) standards and the Bluetooth® wireless standards. In the examples discussed herein, unlicensed spectrum will refer to typical WiFi frequency bands. It can be appreciated, however, that in other implementations, other frequency bands could alternatively or additionally be used.

Figure 1:
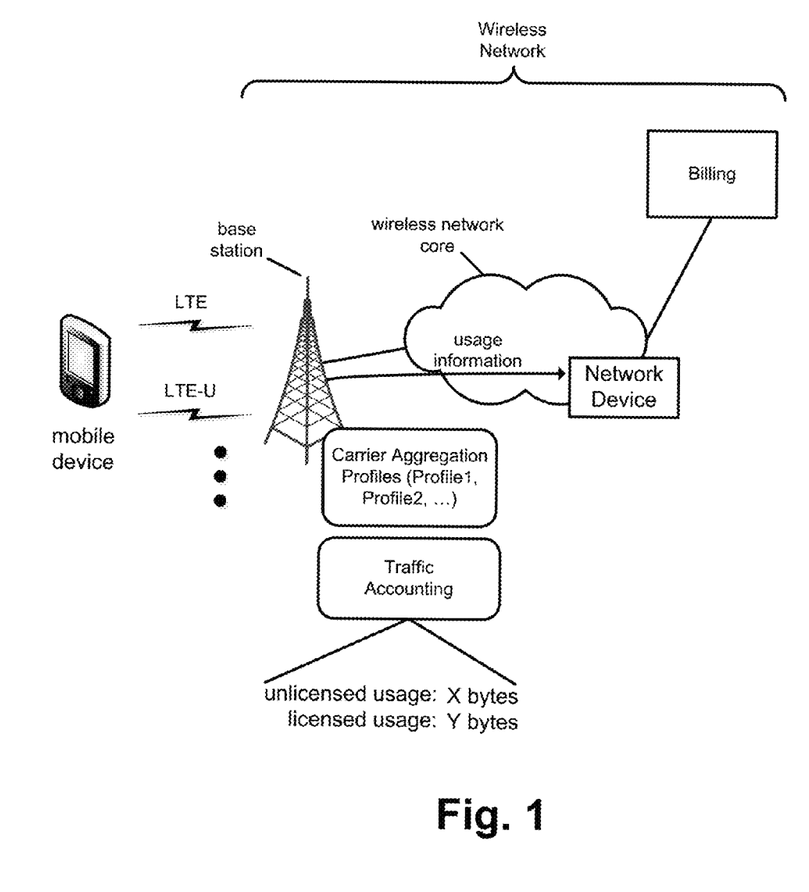
FIG. 1 is a diagram illustrating an example overview of an implementation described herein.

FIG. 1 is a diagram illustrating an example overview of an implementation described herein. As shown in FIG. 1, a mobile device, such as a smart phone or other portable communication device, may communicate via a wireless network, such as a wireless network implemented by a wireless telecommunications provider. The wireless network may include one or more base stations that implement the air (i.e., radio) interface between the mobile device and the wireless network. The mobile device may communicate with the wireless network using both licensed radio spectrum (LTE communications) and unlicensed radio spectrum (LTE-U communications). Communications via the unlicensed radio spectrum may be performed, for example, by the mobile devices when in range of small cells that are implemented using unlicensed spectrum (e.g., WiFi small cells).

Consistent with aspects described herein, the base station may include a traffic accounting function that may track data usage (e.g., an amount of data communicated), by the mobile device, over the unlicensed and licensed radio spectrums. For example, the base station may keep track of the number of bytes communicated using the unlicensed communication spectrum (e.g., LTE-U communications, "unlicensed usage: X bytes") and the number of bytes communicated using the licensed communication spectrum (e.g., LTE communications, "licensed usage: Y bytes"). Usage information may be tracked for each mobile device or user, and, in some implementations, may be additionally tracked based on the QoS of the traffic. For example, a mobile device may be associated with a number of different guaranteed bit rate (GBR) bearers. GBR bearers that have different bit rates may be tracked separately.

At some point, the base station may transmit the licensed/unlicensed usage information (e.g., the number of bytes used) to network devices in the wireless network core ("usage information"). For example, an interface may be defined between the base station and a network device (e.g., a gateway) in the wireless network core. The interface may be used to upload the usage information to the gateway. The gateway may aggregate the usage information, corresponding to a single mobile device or user, and periodically or occasionally transmit the usage information to a billing system associated with the wireless network.

In some implementations, the base station may maintain a number of carrier aggregation profiles, illustrated as Profile1, Profile2, etc., each of which may relate to how traffic, over the radio interface and with the mobile device, should be divided between the unlicensed/licensed spectrum. Each profile may also be associated with activation criteria that indicates when the profile should be made active. The profiles may be activated on a per-mobile device basis. For example, a profile may specify that only licensed spectrum should be used. Another profile may specify that a certain percentage of traffic for a user should be licensed spectrum and the rest should be unlicensed spectrum. As another example, a profile may specify that certain types of traffic should be communicated using licensed spectrum and other types of traffic should preferentially be communicated using unlicensed spectrum. Whether to activate a profile for a particular mobile device may be based on criteria such as preferences associated with mobile device, time of day, date, network load, etc.

Figure 2:
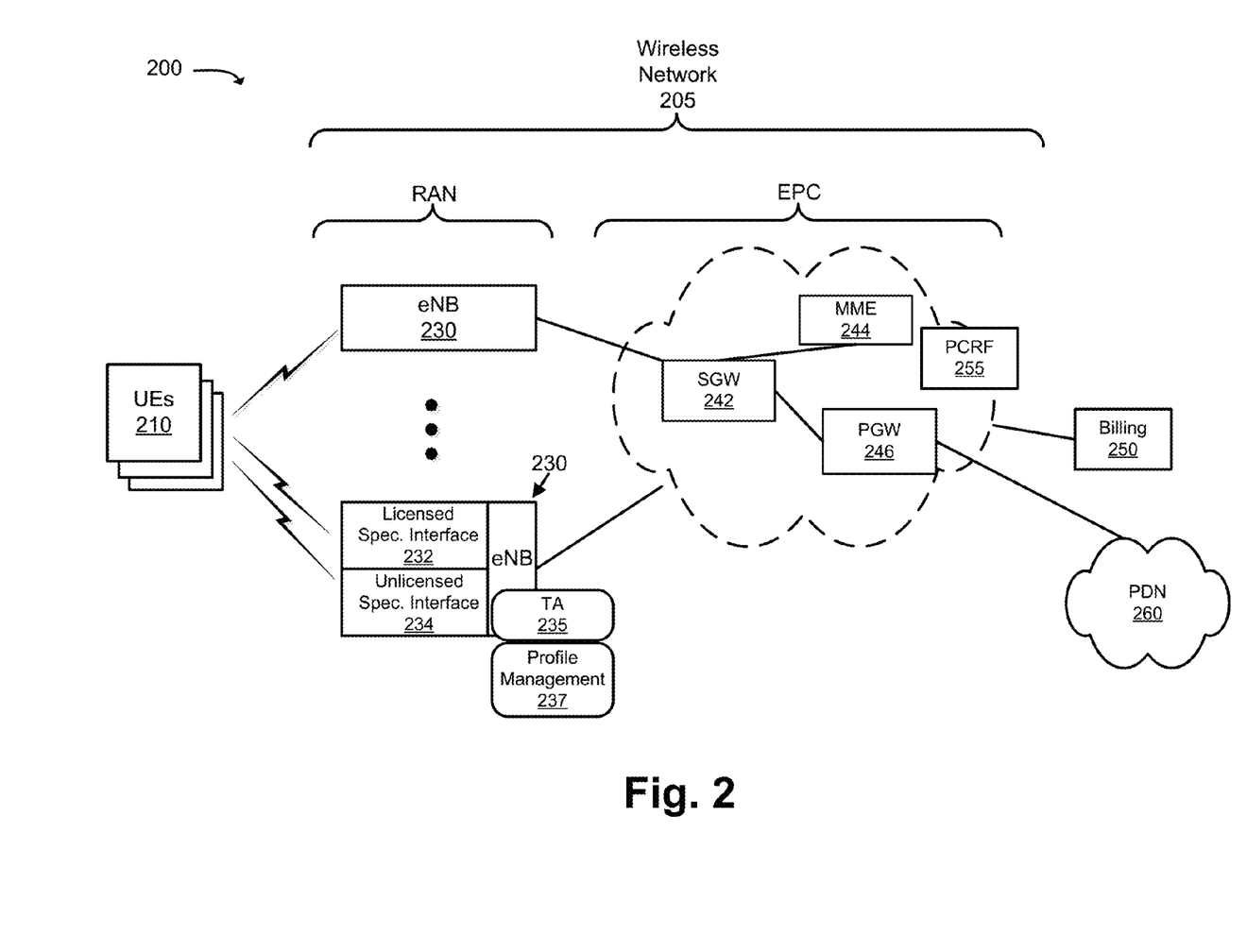
FIG. 2 is a diagram illustrating an example environment in which systems and/or methods described herein may be implemented.

FIG. 2 is a diagram illustrating an example environment 200 in which systems and/or methods described herein may be implemented. As illustrated, environment 200 may represent a wireless cellular network that is implemented based on a 3GPP ($3^{rd}$ Generation Partnership Project) LTE-based standard. Environment 200 may include one or more user devices, which, in the context of an LTE-based network, may be referred to as User Equipment (UE or UEs) 210. UEs 210 may connect, via air (i.e., radio) interfaces, to wireless network 205. Wireless network 205 may include a Radio Access Network (RAN) and an Evolved Packet Core (EPC).

Wireless network 205 may additionally connect to one or more external packet data networks (PDNs), such as PDN 260. Additionally, as shown in FIG. 2, environment 200 may include billing server 260. Billing server 260, although illustrated in FIG. 2 as being external to wireless network 205, may, in practice, be included within wireless network 205 and/or included within PDN 260.

UE 210 may include a portable computing and communication device, such as a personal digital assistant (PDA), a smart phone, a cellular phone, a laptop computer with connectivity to a cellular wireless network, a tablet computer, etc. UE 210 may also include non-portable computing devices, such as desktop computers, consumer or business appliances, or other devices that have the ability to wirelessly connect to wireless network 205. UE 210 may include multiple radio transceivers, such as a first radio transceiver that is designed to communicate using licensed radio spectrum and a second radio transceiver that is designed to communicate using unlicensed radio spectrum (e.g., a 2.4 GHz and/or a 5 GHz spectrum associated with WiFi).

The RAN may be a 3GPP RAN that may include a number of macrocells and/or small cells, which, in the context of LTE, may be referred to as evolved Node Bs (eNBs) 230. eNBs 230 may be associated with LTE-U cells and LTE cells. The RAN, which may include the LTE-U small cells, may include multiple access technologies, such as an access technology using licensed frequency spectrum and an access technology using unlicensed frequency spectrum. The access technology using licensed frequency spectrum is illustrated as Licensed Spectrum Interface 232 and the access technology using unlicensed frequency spectrum is illustrated as Unlicensed Spectrum Interface 234. Both Licensed Spectrum Interface 232 and Unlicensed Spectrum Interface 234 may use 3GPP LTE communication protocols to implement radio communication links with UE 210.

In one implementation, an LTE-U small cell may be formed by eNB 230 or by a remote radio head associated with eNB 230. A "small cell" may generally refer to a femtocell, picocell, microcell, or the like, which may generate a relatively small (e.g., a radius of tens of meters up to one or two kilometers) radio footprint. Small cells may be used by network providers to extend the coverage area and/or increase network capacity provided by traditional macrocells.

In various limitations, eNB 230 may include, and/or be communicatively coupled with, traffic accounting function 235 and/or profile management function 237. Traffic accounting function 235 and profile management function 237 may be implemented as software, hardware, or as a combination of hardware and software in, or coupled with, eNB 230. Traffic accounting function 235 may generally operate to track the usage of licensed and unlicensed radio spectrum by UEs 210. Profile management function 237 may generally operate to control the activation and deactivation of the profiles implement by eNB 230. The operation of traffic accounting function 235 and profile management function 237 will be described in more detail below.

The EPC may include an IP-based architecture that is used to connect the RAN to external networks, such as PDN 260. As illustrated, the EPC may include serving gateway (SGW) 242, Mobility Management Entity (MME) 244, PDN gateway (PGW) 246, and Policy Charging and Rules Function (PCRF) 255. The EPC may generally provide "backend" connectivity functions for the RAN, such as security functionality, mobility functionality (e.g., UE hand offs between cells), UE attachment functionality, etc.

SGW 242 may include one or more network devices that aggregate traffic received eNBs 230 and/or from other devices associated with small cells or macrocells. SGW 242 may generally handle user (data) plane traffic. MME 244 may include one or more computation and communication devices that perform operations to register UE 210 with the EPC, establish bearer channels associated with a session with UE 210, hand off UE 210 from one cell or eNB to another, and/or perform other operations. MME 244 may generally handle control plane traffic. SGW 242 may include one or more network devices that aggregate traffic received from one or more eNBs.

PGW 246 may include one or more devices that act as the point of interconnect between the EPC and external IP networks, such as PDN 260, and/or operator IP services. PGW 246 may route packets to and from the access networks and the external IP networks.

Billing server 250 may include one or more computing devices to perform billing and/or charging functions for an operator of wireless network 205. In one implementation, the operator of wireless network 205 may charge users (i.e., users of UEs 210) based on the amount of traffic used by UEs 210. In some situations, the operator of wireless network 205 may charge different rates for traffic that is communicated using licensed frequency spectrum (e.g., LTE traffic) relative to traffic that is communicated using unlicensed is expected (e.g., LTE-U traffic).

PCRF 255 may include one or more devices to receive information regarding policies and/or subscriptions from one or more sources, such as subscriber databases and/or from one or more users (such as, for example, an administrator associated with PCRF 255). PCRF 255 may provide policy information, such as charging policies relating to how to aggregate licensed and unlicensed frequency usage, to PGW 246 and/or other devices. PCRF 255 may operate in real-time to determine policy rules for the network.

PDN 260 may include a packet-based network. PDN 260 may include external networks, such as a public network (e.g., the Internet) or proprietary networks that provide services that are provided by the operator of wireless network 205 (e.g., IP multimedia (IMS)-based services, transparent end-to-end packet-switched streaming services (PSSs), or other services).

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3:
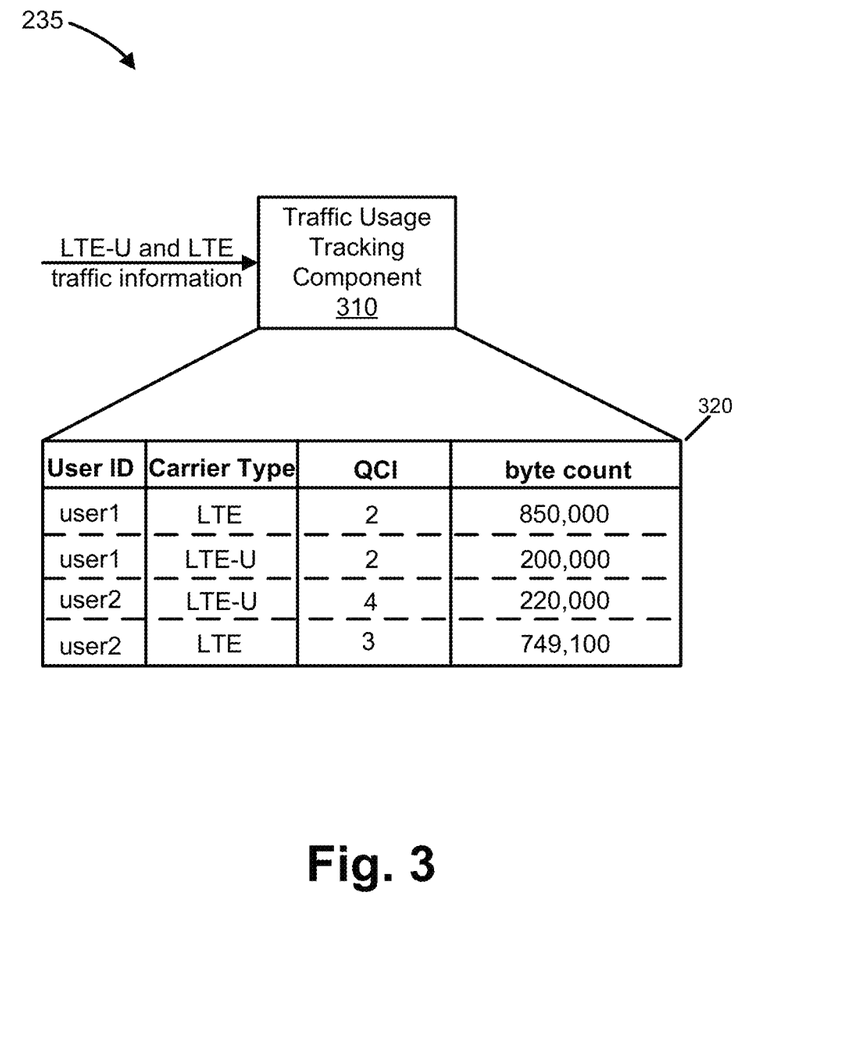
FIG. 3 is a block diagram conceptually illustrating functionality that may be associated with a traffic accounting function.

FIG. 3 is a block diagram conceptually illustrating functionality that may be associated with traffic accounting function 235. As illustrated, traffic accounting function 235 may include traffic usage tracking component 310. Traffic usage tracking component 310 may receive information relating to user traffic that is transmitted and/or received, over the radio interface, of eNB 230. For example, traffic usage tracking component 310 may receive statistics or other summary information that can be used to track the usage of the licensed and unlicensed spectrum at eNB 230. Alternatively or additionally, traffic usage tracking component 310 may directly monitor or be associated with the radio interfaces of eNB 230 to track the usage of the licensed and the unlicensed spectrum.

In one implementation, the usage of the license and the unlicensed spectrum may be tracked based on QoS. For example, in LTE, QoS Class Identifiers (QCI) may be used to ensure that traffic is allocated appropriate QoS guarantees. Different bearer traffic may require different QoS guarantees, which may be represented by different QCI values. For example, nine different QCI values may be used to represent 9 different classes, with each class having appropriate QoS parameters for the traffic type. Examples of the QoS parameters include Guaranteed Bit Rate (GBR) or non-Guaranteed Bit Rate (non-GBR), Priority Handling, Packet Delay Budget, and Packet Error Loss rate.

An example data structure 320 is shown in FIG. 3. Data structure 320 may be maintained by, for example, traffic usage tracking component 310 to track the usage of the licensed and the unlicensed traffic. Data structure 320 may be particularly used to track data usage on a per-user and per-QCI basis. Data structure 320 may include a user identifier (ID) field, a carrier type field, a QCI field, and a byte count field.

The user ID field may identify particular users and/or UEs 210. For example, users may be identified by mobile directory numbers ("MDNs"), assigned IP addresses, International Mobile Station Equipment Identity ("IMEI") values, International Mobile Subscriber Identity ("IMSI") values, account labels, or other values. In example data structure 320, the labels "user1" and "user2" are used to distinguish between data associated with two different UEs 210. The carrier type field may indicate whether a particular record (i.e., row, in this example) is tracking licensed (LTE) or unlicensed (LTE-U) traffic. The QCI field may indicate the QCI value of the traffic, and the byte count field may be used to indicate the total of bytes transmitted for the particular user ID, QCI field, and carrier type.

A number of example values are shown for data structure 320. For example, for the UE corresponding to "user1," 850,000 bytes may have been transmitted for licensed traffic having the QCI value of 2, and 200,000 bytes may have been transmitted for unlicensed traffic having the QCI value of 2. Similarly, for the UE corresponding to "user2," 220,000 bytes may have been transmitted for unlicensed traffic having the QCI value of 4, and 749,100 bytes may have been transmitted for licensed traffic having the QCI value of 3.

Consistent with aspects described herein, the usage information tracked by eNB 230 may be periodically or occasionally transmitted to PGW 246. PGW 246 may aggregate usage information from one or more eNBs 230. PGW 246 may additionally transfer the usage information, or information derived from usage information, to billing server 250. In one implementation, PGW 246 may transfer the usage information, to billing server 250, using the 3GPP standardized Rf interface.

Figure 4:
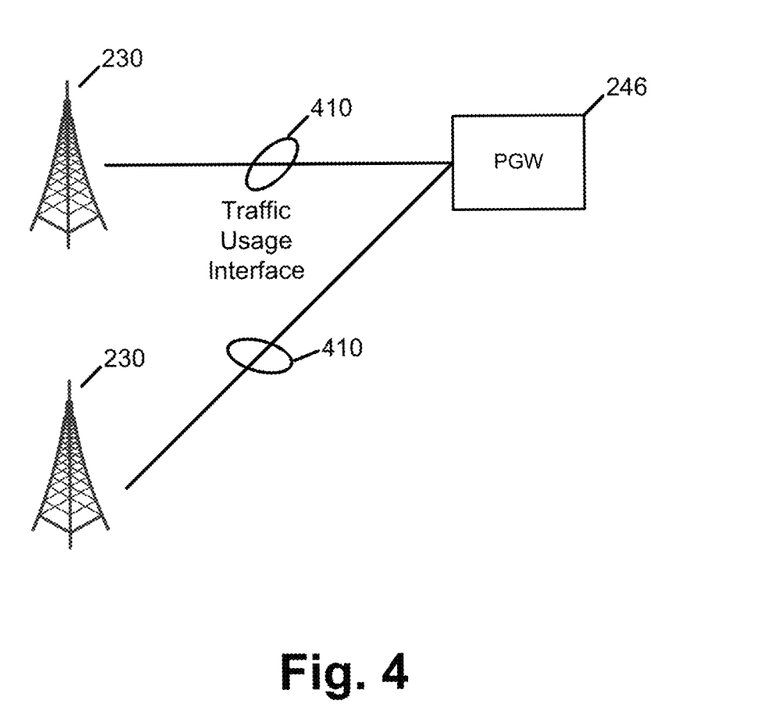
FIG. 4 is a diagram illustrating an example of the communication of spectrum usage information between an evolved node B (eNB) and a gateway.

FIG. 4 is a diagram illustrating an example of the communication of the usage information between eNB 230 and PGW 246. The usage information may be transmitted using traffic usage interface 410, defined between eNB 230 and PGW 246. An "interface," as used in this context, may refer to a logical interface that is defined by one or more rules or protocols that indicate, for example, data structures and/or data types that may be communicated using the interface. Traffic usage interface 410 may represent an interface, between eNB 230 and PGW 246, that is designed to transmit usage information, such as the usage information illustrated in data structure 320. For example, traffic usage interface may define messages that can be exchanged between eNB 230 and PGW 246, in which each message includes one or more objects that each identify a particular QCI, user, time period, carrier type, and byte count. Each of the objects may thus indicate the number of bytes used, by a particular user, and corresponding to a particular QCI, for licensed or unlicensed spectrum usage.

Figure 5:
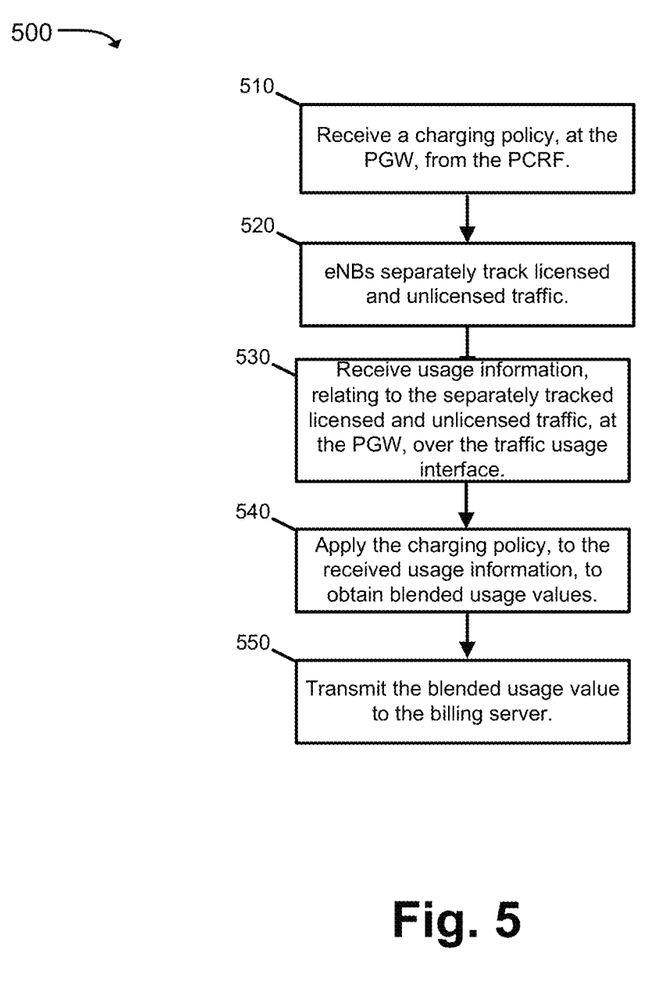
FIG. 5 is a flow chart illustrating an example process for separately tracking licensed and unlicensed spectrum usage.

FIG. 5 is a flow chart illustrating an example process 500 for separately tracking licensed and unlicensed spectrum usage. Process 500 may be performed by, for example, PGW 246 and/or by eNBs 230.

Process 500 may include receiving a charging policy (block 510). For example, the charging policy, or multiple charging policies, may be received, from PCRF 255, by PGW 246. In one implementation, the charging policy may relate to weighting factors to apply to the licensed/unlicensed frequency spectrum. For example, the data used in the licensed frequency spectrum may be counted as "normal" data usage and data used in the unlicensed frequency spectrum may be tracked at a discounted rate. For example, the byte count for unlicensed frequency spectrum data may be multiplied by a factor that is less than one and could be zero (e.g. by 0.5). In general, the received charging policy may specify any technique for combining the byte counts for the licensed and unlicensed frequency spectrum to obtain a "blended" byte count. The blended byte count may be computed on a per-QCI and per-user basis. Alternatively or additionally, the charging policy may specify a technique to further combine the blended byte counts over multiple QCI values.

Process 500 may further include tracking the licensed and unlicensed traffic (block 520). As previously mentioned, traffic accounting function 235, implemented at eNBs 230, may maintain a byte count associated with user traffic. The byte count may be maintained separately for the licensed and unlicensed frequency spectrum traffic and may be maintained on a per-user and per-QCI basis.

Process 500 may further include receiving usage information, relating to the separately tracked licensed and unlicensed traffic (block 530). The usage information may include the byte count values and may be received by PGW 246 for multiple eNBs 230. The usage information may be received through traffic usage interface 410. PGW 246 may aggregate usage information from multiple eNBs.

Process 500 may further include applying the charging policy, to the receive usage information, to obtain a blended usage value or values (block 540). As mentioned, the charging policy may describe how a user is to be charged for licensed and unlicensed frequency spectrum usage. In one implementation, the blended usage value may be obtained as: LTE_Byte_Count+N*LTE-U_Byte_Count, where LTE-_Byte_Count represents the byte count (for a particular user and QCI value) corresponding to licensed frequency spectrum, LTE-U_Byte_Count represents the byte count (for a particular user and QCI value) corresponding to unlicensed frequency spectrum, and N represents a discount factor (e.g., less than one) to apply to the unlicensed frequency spectrum. With this example charging policy, users may be provided with a charging discount when using the unlicensed spectrum.

Process 500 may further include transmitting the blended usage value to the billing server (block 550). For example, the Rf interface may be use to transmit the blended usage byte counts to billing server 250. In some implementations, billing server 250 may charge particular users based on the bytes counts using existing billing practices. That is, from the point of view of billing server 250, traditional billing may be performed.

As previously mentioned, in some implementations, eNBs 230 may maintain profiles that each indicate how carrier aggregation is to be divided between licensed and unlicensed spectrum. For example, a particular profile, when active, may indicate a target ratio of use for the licensed/unlicensed spectrum. The usage tracking of licensed and unlicensed data may be used to implement the profile, such as being used to determine when to activate or deactivate a particular profile.

Figure 6:
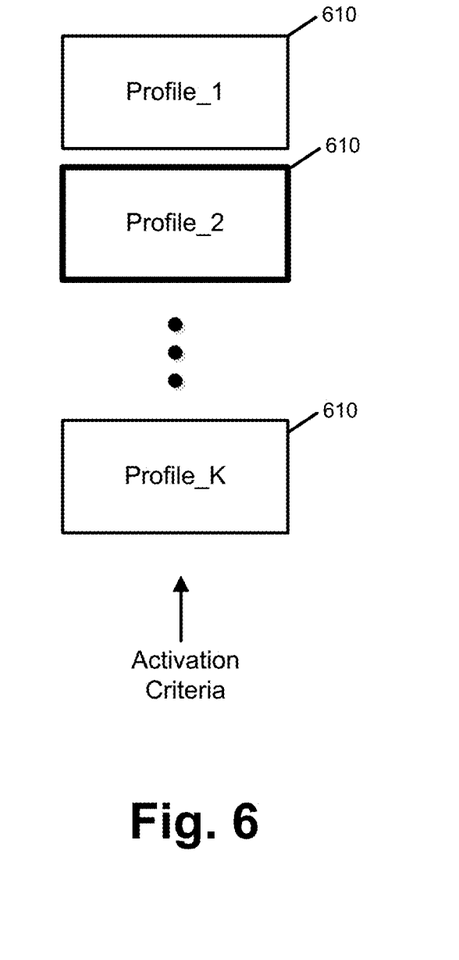
FIG. 6 is a diagram illustrating an example of different profiles that may be configured at an eNB.

FIG. 6 is a diagram an example of different profiles that may be configured at an eNB 230. As illustrated, one or more profiles 610, shown as Profile_1, Profile_2, . . . Profile_K, may be installed or otherwise configured at eNBs 230. Each profile 610 may generally relate to whether carrier aggregation (e.g., the use of both LTE and LTE-U communications) should be used and/or rules defining details relating to the use of carrier aggregation (e.g., proportion of data that is to be sent over the licensed and unlicensed frequency spectrums). Each profile 610 may additionally be associated with activation criteria that indicates when a particular profile is active. Additionally, in some implementations, different active profiles 610 may be associated with different charging policies at PGW 246. In some implementations, a profile 610 may be activated on a per-user basis. In FIG. 6, Profile_2 is shown using a bold line, which may indicate that Profile_2 is the currently active profile.

A non-exhaustive list of example functions, associated with different profiles, may include the following:

(1) Only use licensed LTE carriers (i.e., only use the licensed frequency spectrum).
(2) Use licensed carriers for a certain portion of a user's data (e.g., L %) and unlicensed carriers for another portion of the user's data (e.g., M %, where L+M=100%).
(3) Use licensed carriers for specific types of data (e.g., voice over LTE (VoLTE)) and unlicensed carriers for any other types of data.
(4) Use licensed carriers for emergency calls and unlicensed carriers for all other types of data.
(5) Use licensed carriers for real-time, delay sensitive services (e.g., VoLTE) and unlicensed best effort services for other types of data (e.g., file transfers).

Different profiles 610 may be activated based on different activation criteria. For example, factors that may be used when determining whether to activate a particular profile 610 for a particular user, or for particular user and QCI value, may include: the byte count of licensed and or unlicensed data that has been used for the user; the location of eNB 230 (e.g., the particular market or geographical features of the market in which the user is located); time or date (e.g., weekends, day hours, work hours, etc.); network load; user preferences; the known availability or quality of unlicensed carriers in a particular area; or other factors.

As one particular example, assume that for a particular user, the activation criteria indicates that profile (1) (only use licensed LTE carriers) is active during the work week (e.g., from 7 am-6 pm, Monday through Friday) and that profile (3) (use licensed carriers for VoLTE) is active at other times. In this situation, the user may be guaranteed high quality connections during business hours, when the user is presumably making business related calls, but uses unlicensed spectrum during non-business hours.

As another example, for a residential user, Profile (4) may be active by default, potentially in order to save charges for the user. Profile (3) may be activated whenever the user is in a location in which the unlicensed spectrum has poor bandwidth or is otherwise known to not be reliable. As a related example, a market may have relatively high interference on unlicensed frequency spectrum during certain hours of operation. In this situation, the network operator may activate a to only use licensed frequency spectrum and completely block the use of the unlicensed carriers during those hours (i.e., carrier aggregation may not be performed during those hours). As another example, a user may use profile (1) until a threshold level of licensed data has been used for a particular period (e.g., a month). From that point onward, profile (4) may be active for the user.

Figure 7:
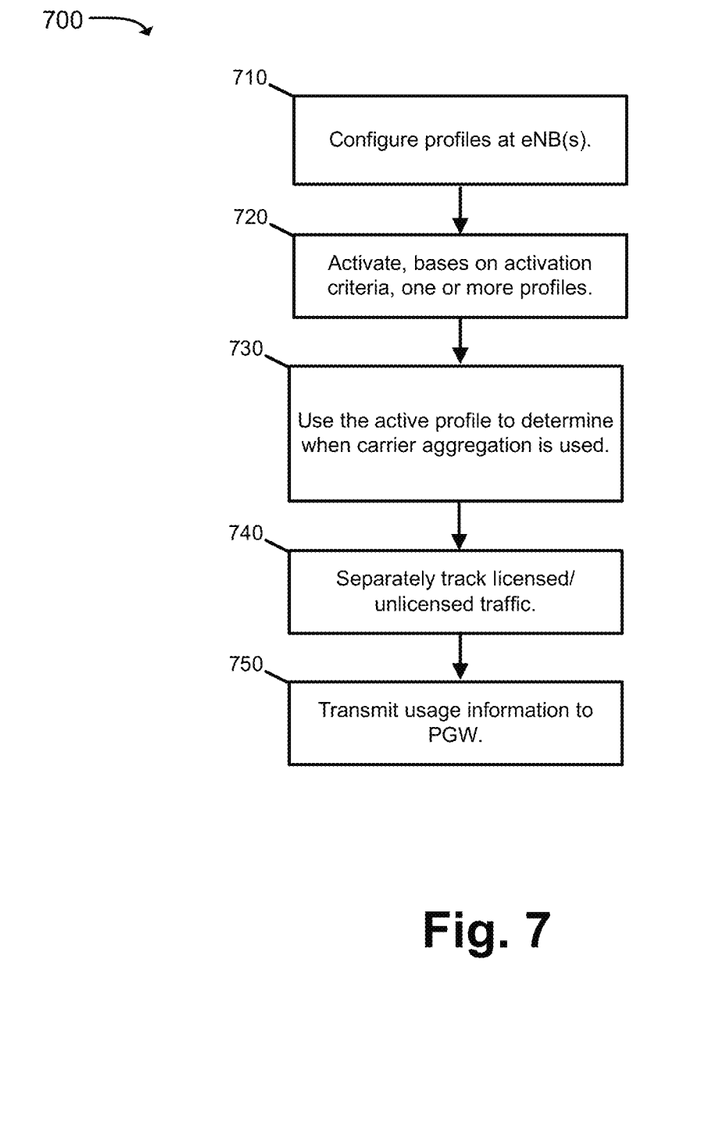
FIG. 7 is a flow chart illustrating an example process for using profiles to control carrier aggregation at eNBs.

FIG. 7 is a flow chart illustrating an example process 700 for using profiles to control carrier aggregation at eNBs 230. Process 700 may be performed by, for example, eNB 230, such as by profile management function 237.

Process 700 may include configuring profiles at the eNBs (block 710). For example, one or more profiles, such as profiles 610, may be installed at eNBs 230. Profiles 610 may be configured at eNB 230 during the initial provisioning of eNB 230 and/or installed by a device associated with wireless network 205, such as by PCRF 255. As previously mentioned, profile 610 may be associated with activation criteria that indicates when a particular profile should be activated (e.g., for a particular user).

Process 700 may further include activating, based on the activation criteria, one or more profiles (block 720). As previously mentioned, a number of factors may be used to determine when to activate (or deactivate) a profile for a particular UE 210 (or for a group of UEs). The factors, such as the byte count corresponding to licensed usage by the particular UE 210, may be applied to one or more thresholds to determine when to activate or deactivate a particular profile for the particular UE 210. An active profile may include rules relating to the use of carrier aggregation.

Process 700 may further include using the active profile to determine when to use carrier aggregation (block 730). As mentioned with respect to FIG. 6, depending on the active profile, carrier aggregation, using both the licensed and unlicensed frequency bands, may be implanted in a variety of ways. For example, user traffic may be split, in a particular proportion, between the licensed and unlicensed frequency bands. As another example, different applications or types of data may be assigned, by the active profile, to either the licensed or unlicensed frequency band.

Process 700 may further include separately tracking the licensed and unlicensed traffic (block 740). As previously mentioned, traffic accounting function 235, implemented at eNBs 230, may maintain a byte count associated with user traffic. The byte count may be maintained separately for the licensed and unlicensed frequency spectrum traffic and may be maintained on a per-user and per-QCI basis.

Process 700 may further include storing and/or outputting the tracked usage information (block 750). As previous he mentioned, the usage information may be transmitted via traffic usage interface 410 to PGW 246 and/or another device. In some implementations, identification of the particular active profile, associated with the usage information, may also be transmitted to PGW 246. The identification of the particular active profile may be used to apply different charging policies for different profiles.

Figure 8:
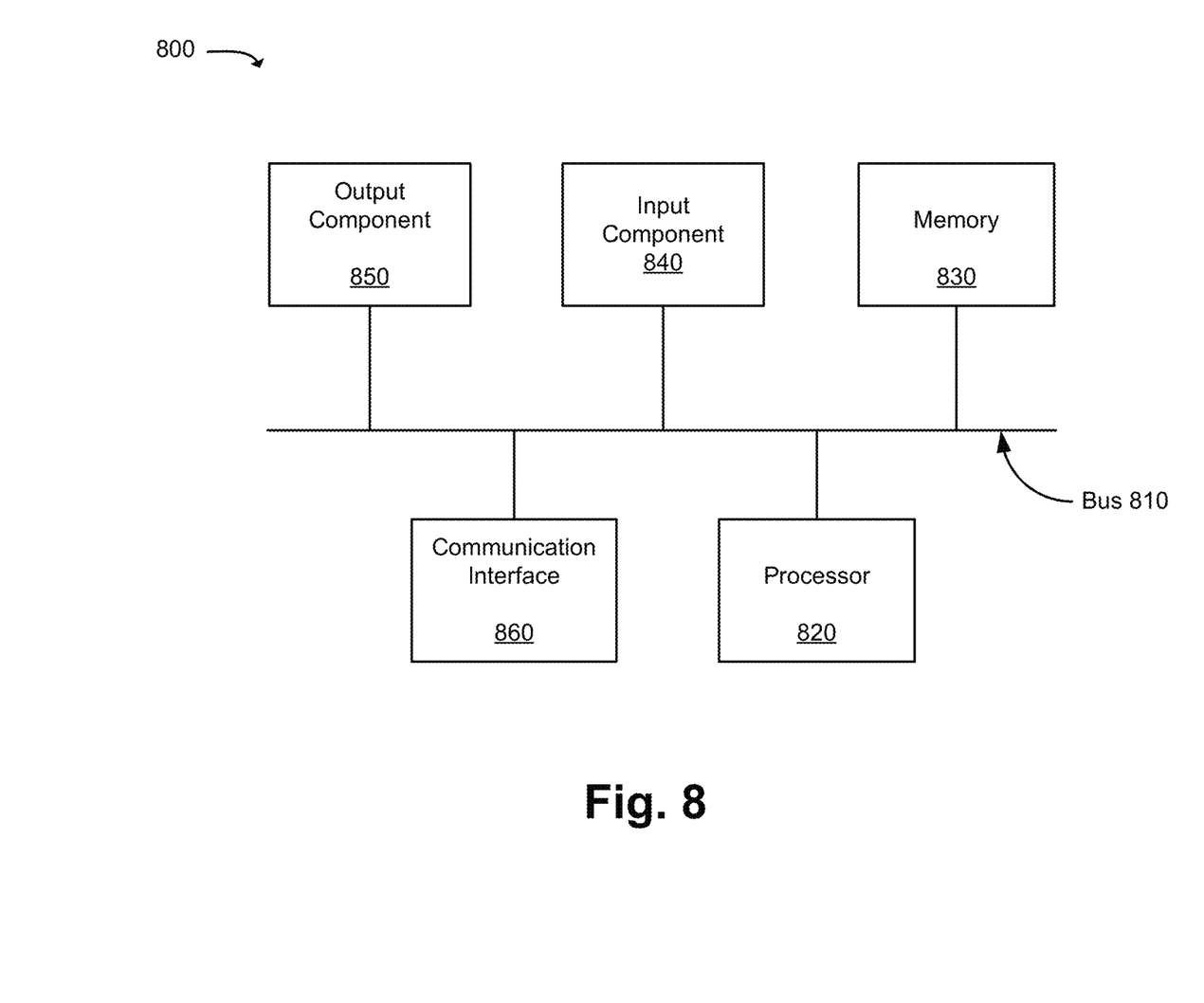
FIG. 8 is a diagram of example components of a device.

FIG. 8 is a diagram of example components of a device 800. One or more of the devices described above (e.g., as described with respect to FIGS. 1-4) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may include processing circuitry to interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 820 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 7, the order of the blocks may be modified in other implementations. Further, non-dependent blocks may be performed in parallel. In some implementations, additional blocks may be performed before, after, or in between the described blocks.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network device comprising:
   a first radio interface to implement Long Term Evolution (LTE) radio links with mobile devices using a first frequency spectrum;
   a second radio interface to implement LTE Unlicensed (LTE-U) radio links with the mobile devices using a second frequency spectrum;
   a computer-readable medium to store:
      a plurality of profiles, each of the plurality of profiles relating to a use of carrier aggregation, for the mobile devices, and implemented using the LTE and LTE-U radio links, wherein each of the plurality of profiles is associated with activation criteria, and
      processor-executable instructions; and
   processing circuitry to execute the processor-executable instructions to:
      track, on a per-user and per-Quality of Service (QoS) basis, an amount of user traffic that is communicated using the LTE radio links;
      track, on a per-user and per-QoS basis, an amount of LTE-U user traffic that is communicated using the LTE-U radio links;
      transmit, to a device associated with the cellular network, an indication of the tracked amount of LTE user traffic and the tracked amount of LTE-U user traffic; and
      selectively activate one or more of the plurality of profiles, for one or more particular mobile devices of the mobile devices, based on the activation criteria, to implement carrier aggregation for the one or more particular mobile devices based on the amount of user traffic that is communicated using the LTE radio links and the amount of LTE-U user traffic that is communicated using the LTE-U radio links.

2. The network device of claim 1, wherein the activation criteria is based on thresholds applied to one or more of:
   a byte count associated with the LTE and LTE-U user traffic;
   a location of the network device;
   times or dates;
   network load; or
   an availability or quality of LTE-U carriers in a vicinity of the network device.

3. The network device of claim 1, wherein the network device includes an evolved NodeB (eNB) and the device includes a packet data network gateway (PGW) associated with the cellular network.

4. The network device of claim 3, wherein the processing circuitry, when transmitting the indication of the tracked amount of user traffic, is to:
   transmit the indication via a logical interface defined between the eNB and the PGW.

5. The network device of claim 3, wherein the processing circuitry is to further execute the processor executable instructions to:
   transmit identification of the selected profile to the PGW.

6. The network device of claim 1, wherein the activated profile indicates when to use carrier aggregation.

7. The network device of claim 6, wherein the activated profile indicates, when carrier aggregation is active, a ratio of user data that is transmitted over the LTE and LTE-U radio links.

8. A method, implemented by a base station in a wireless network, the method comprising:
   performing carrier aggregation to aggregate the transmission of user traffic over Long Term Evolution (LTE) radio links using a first frequency spectrum and LTE Unlicensed (LTE-U) radio links using a second frequency spectrum;
   tracking, on a per-user and per-Quality of Service (QoS) basis, an amount of user traffic that is communicated using the LTE radio links;
   tracking, on a per-user and per-QoS basis, an amount of LTE-U user traffic that is communicated using the LTE-U radio links;
   transmitting, to a device associated with the wireless network, an indication of the tracked amount of LTE user traffic and the tracked amount of LTE-U user traffic;
   storing a plurality of profiles, each of the plurality of profiles relating to a use of carrier aggregation, for mobile devices associated with the base station, and implemented using the LTE and LTE-U radio links, wherein each of the plurality of profile is associated with activation criteria; and
   selectively activating one or more of the plurality of profiles, for one or more particular mobile devices of the mobile devices, based on the activation criteria, to implement carrier aggregation for the one or more particular mobile devices based on the amount of user traffic that is communicated using the LTE radio links and the amount of LTE-U user traffic that is communicated using the LTE-U radio links.

9. The method of claim 8, wherein the activation criteria is based on thresholds applied to one or more of:
   a byte count of LTE and LTE-U user traffic;
   a location of the network device;
   times or dates;
   network load; or
   an availability or quality of LTE-U carriers in a vicinity of the network device.

10. The method of claim 8, wherein the activated profile indicates when to use carrier aggregation.

11. The method of claim 10, wherein the activated profile indicates, when carrier aggregation is active, a ratio of user data that is transmitted over the LTE and LTE-U radio links.

12. The method of claim 8, wherein the base station includes an evolved NodeB (eNB) and the gateway device includes a packet data network gateway (PGW) associated with the cellular network.

13. The method of claim 10, wherein the method further includes:
transmitting the indication of the tracked amount of user traffic via a logical interface defined between the base station and the gateway device.

14. A system comprising:
a base station, in a wireless network, configured to:
track an amount of user traffic that is communicated using Long Term Evolution (LTE) radio links over a first frequency spectrum;
track an amount of user traffic that is communicated using LTE Unlicensed (LTE-U) radio links over a second frequency spectrum; and
transmit an indication of the tracked amount of LTE user traffic and the tracked amount of LTE-U user traffic; and
a packet data network gateway (PGW), in the wireless network, configured to:
receive, from the base station, the indication of the tracked amount of LTE user traffic and LTE-U user traffic;
receive at least one charging policy indicating a technique for combining the tracked amount of LTE user traffic and LTE-U user traffic;
combine, based on the charging policy, the tracked amount of LTE user traffic and LTE-U user traffic, to obtain a blended usage factor; and
transmit the blended usage factor to a server for the wireless network, the server performing functions relating to monitoring use of the wireless network by the users,
wherein the base station stores a plurality of profiles, each of the plurality of profiles relating to a use of carrier aggregation, for mobile devices associated with the base station, and implemented using the LTE and LTE-U radio links, wherein each of the plurality of profile is associated with activation criteria; and
wherein the base station is further to:
selectively activate one or more of the plurality of profiles, for one or more particular mobile devices of the mobile devices, based on the activation criteria, to implement carrier aggregation for the one or more particular mobile devices based on the amount of user traffic that is communicated using the LTE radio links and the amount of LTE-U user traffic that is communicated using the LTE-U radio links.

15. The system of claim 14, wherein the PGW is further to:
combine the tracked amount of LTE user traffic and LTE-U user traffic, to obtain the blended usage factor, using the formula: LTE+LTE-U*N, where LTE represents a byte count of the LTE user traffic, LTE-U represents a byte count of the LTE-U user traffic, and N represents a discount factor that is between zero and one.

16. The system of claim 15, wherein the amount of user traffic that is communicated using the LTE radio links and the amount of user traffic that is communicated using the LTE-U radio links is tracked on a per-user and per-Quality of Service (QoS) basis.

17. The system of claim 14, wherein the transmission of the indication of the tracked amount of the LTE user traffic and the LTE-U user traffic is performed via a logical interface defined between the base station and the PGW.

18. The network device of claim 1, wherein the first frequency spectrum includes licensed frequency spectrum and the second frequency spectrum includes unlicensed frequency spectrum.

19. The method of claim 8, wherein the wherein the first frequency spectrum includes licensed frequency spectrum and the second frequency spectrum includes unlicensed frequency spectrum.

* * * * *